US011677726B2

(12) United States Patent
Ray et al.

(10) Patent No.: US 11,677,726 B2
(45) Date of Patent: Jun. 13, 2023

(54) SCALABLE BROKERLESS MESSAGING STRATEGY WITH SIDECAR SECURITY CONTAINER STACK

(71) Applicant: RAYTHEON COMPANY, Waltham, MA (US)

(72) Inventors: Alex C. Ray, St. Petersburg, FL (US); Juan D. Caldas, Tampa, FL (US)

(73) Assignee: RAYTHEON COMPANY, Waltham, MA (US)

( * ) Notice: Subject to any disclaimer, the term of this patent is extended or adjusted under 35 U.S.C. 154(b) by 197 days.

(21) Appl. No.: 17/174,848

(22) Filed: Feb. 12, 2021

(65) Prior Publication Data

US 2022/0263805 A1 Aug. 18, 2022

(51) Int. Cl.
*H04L 9/40* (2022.01)
*H04L 67/56* (2022.01)
*H04L 9/30* (2006.01)

(52) U.S. Cl.
CPC ............ *H04L 63/0428* (2013.01); *H04L 9/30* (2013.01); *H04L 63/166* (2013.01); *H04L 67/56* (2022.05)

(58) Field of Classification Search
CPC .......................... H04L 63/0428; H04L 63/166
See application file for complete search history.

(56) References Cited

U.S. PATENT DOCUMENTS

| 2014/0059226 | A1 | 2/2014 | Messerli et al. |
| 2016/0050261 | A1 | 2/2016 | McDaid et al. |
| 2017/0094033 | A1 | 3/2017 | Sathyadevan et al. |
| 2019/0268420 | A1* | 8/2019 | Acharya ................. H04L 67/34 |

OTHER PUBLICATIONS

Matthias Milan Strljic, Chris Vollmann, and Oliver Riedel, Shop-Floor Service Connector—a message-oriented Middleware Focused on the Usability and Infrastructure Requirements of SMEs Developing Smart Services, 3rd IEEE International Conference on Knowledge Innovation and Invention 2020, pp. 37-40 (Year: 2020).*
International Search Report and Written Opinion issued in PCT/US2022/015058; Application Filing Date Feb. 3, 2022; dated May 2, 2022 (13 pages).
Strljic et al., "Shop-Floor Service Connector—a message-oriented Middleware Focused on the Usability and Infrastructure Requirements of SMEs Developing Smart Services" 2020 3rd IEEE International Conference on Knowledge Innovation and Invention (ICKII); Aug. 21, 2022 (3 pages) Abstract Only.

* cited by examiner

*Primary Examiner* — Esther B. Henderson
(74) *Attorney, Agent, or Firm* — Cantor Colburn LLP

(57) ABSTRACT

A scalable brokerless messaging network includes a service mesh implementing a plurality of service nodes in signal communication with one another to exchange a plurality of messages. A control plane is in signal communication with the plurality of service nodes and is configured to register an application service associated with a given service node included in the service mesh. The plurality of service nodes define a messaging middleware layer that establishes several point-to-point connections between each service in the network via transmission control protocol (TCP) sockets.

20 Claims, 4 Drawing Sheets

SCALABLE BROKERLESS MESSAGING STRATEGY WITH SIDECAR SECURITY CONTAINER STACK

BACKGROUND

The present disclosure relates to asynchronous service-to-service communication networks, and in particular, to publish/subscribe messaging services.

Publish/subscribe messaging (commonly referred to as "pub/sub" messaging) is a form of asynchronous service-to-service communication used in serverless and microservices architectures. In a pub/sub messaging network, services that produce events are decoupled from services that process events. A "publisher application" creates and sends messages to a "topic", while "subscriber applications" create a "subscription" to one or more topics. Accordingly, a subscriber application will receive messages sent to topics to which it is subscribed. In other words, any message published to a topic is received by all of the subscribers to the topic.

SUMMARY

According to a non-limiting embodiment, a scalable brokerless messaging network includes a service mesh implementing a plurality of service nodes in signal communication with one another to exchange a plurality of messages. A control plane is in signal communication with the plurality of service nodes and is configured to register an application service associated with a given service node included in the service mesh and provide certificates required for encrypted service to service communication. The plurality of service nodes define a messaging middleware layer that establishes several point-to-point connections between each service in the network via transmission control protocol (TCP) sockets.

According to another non-limiting embodiment, a method of exchanging data in a scalable brokerless messaging network comprises establishing signal communication between a service mesh including a plurality of service nodes to exchange a plurality of messages, and establishing signal communication between a control plane and the plurality of service nodes. The method further comprises registering an application service associated with a given service node included in the service mesh and the control plane. The method further comprises defining a messaging middleware layer via the plurality of service nodes to establish a plurality of point-to-point connections between each service node in the service mesh via transmission control protocol (TCP) sockets.

According to yet another non-limiting embodiment, a messaging middleware layer included in a scalable brokerless messaging network comprises a first application process. The first application process is included in a first service node and is configured to operate according to the messaging middleware layer and to exchange data with at least one second application process included in a at least one second service node. The messaging middleware layer dynamically manages a transmission control protocol (TCP) socket connection established between the first service node and the second service node.

Additional features and advantages are realized through the techniques of the present disclosure. Other embodiments and aspects are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
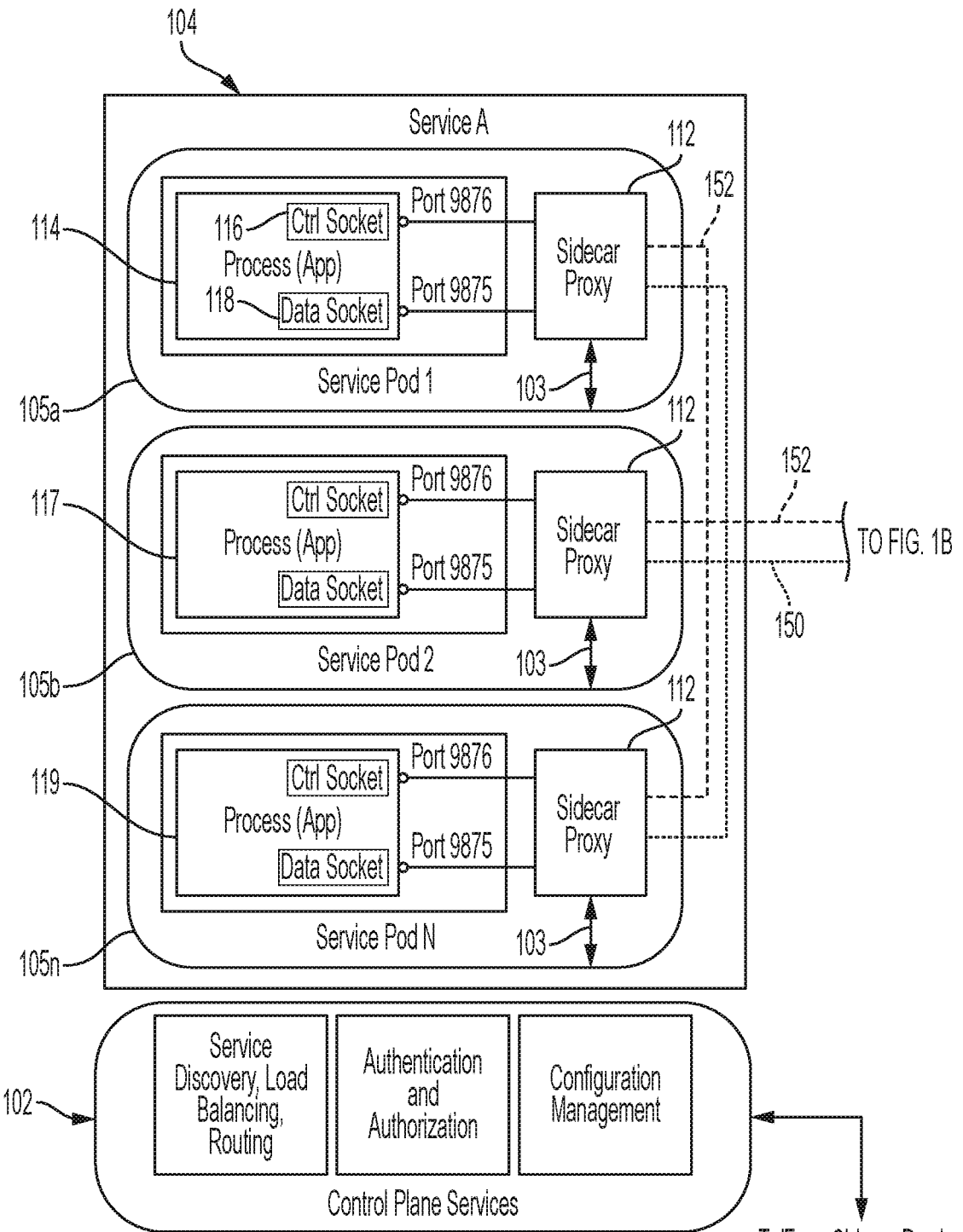
FIGS. 1A and 1B is a block diagram of a scalable brokerless messaging network according to a non-limiting embodiment.

In modern cloud architectures, applications are decoupled into smaller, independent building blocks (sometimes referred to as distributed applications), which are easier to develop, deploy and maintain. Pub/sub messaging can provide instant event notifications for these distributed applications. Many known cloud-based networks that support pub/sub systems employ an intermediate message "broker" with which one or more subscribers register subscriptions. The broker filters published messages by performing a store and forward function to route messages from publishers to subscribers with a subscription to a given publisher. However, the operations performed by the broker adds a significant amount of latency to the end-to-end message delivery. Additionally, conventional cloud architectures do not typically support protocols capable of facilitating a traditional "brokerless" pub/sub messaging network. For instance, a typical solution for facilitating brokerless pub/sub messaging involves employing User Datagram Protocol (UDP) multicasting schemes. However, UDP multicasting schemes are not supported in many cloud-based architectures and cloud service providers as they are often blocked by the cloud networking layer and lack a standard method of securing communications between the publishers and subscribers.

Various non-limiting embodiments described herein provide a scalable brokerless pub/sub messaging network. In one or more non-limiting embodiments, the scalable brokerless pub/sub messaging network can be dynamically scaled across a service mesh based on a load realized by the service mesh and is secure by default through the use of a control plane such as "Istio", for example, to provide "zero trust" architecture and mutual Transport Layer Security (mTLS) encryption between each service node included in the messaging network. The service mesh can achieve scalability using a messaging middleware layer that is capable of supporting a topology that may dynamically increase the instance count (e.g., the number of service pods) of a service. For example, the service mesh can monitor the load and dynamically add service pods to provide relief to a given service node. Scalability can also be achieved via "vertical scaling," to handle increased demand, as well as the ability for the messaging middleware layer to support communication between a dynamic number of services in a network.

In one or more non-limiting embodiments, the scalable brokerless pub/sub messaging network employs "sidecar" security container stacks also referred to as "sidecar proxies", which work in concert with the service nodes within the control plane to discover each other, establish encrypted communication, and dynamically route traffic between services with load balancing through the use of dynamic domain name system (DNS) resolution and network address translation. The services within the control plane dynamically track and distribute load between multiple instances of a service (e.g., service pods) and on ingress the sidecar proxy uses network address translation to convert the destination IP address to that of the destination container within the service pod.

In one or more embodiments, the scalable brokerless pub/sub messaging network includes a messaging middleware layer that is designed to work natively with the service mesh to provide a low-latency, scalable, pub/sub messaging without the use of a message broker. The messaging middleware utilizes Transmission Control Protocol (TCP) sockets which can be encrypted using mutual TLS (mTLS) by the sidecar proxy 112 to secure the data exchange between the services included in the scalable brokerless pub/sub messaging network 100.

Figure 1B:
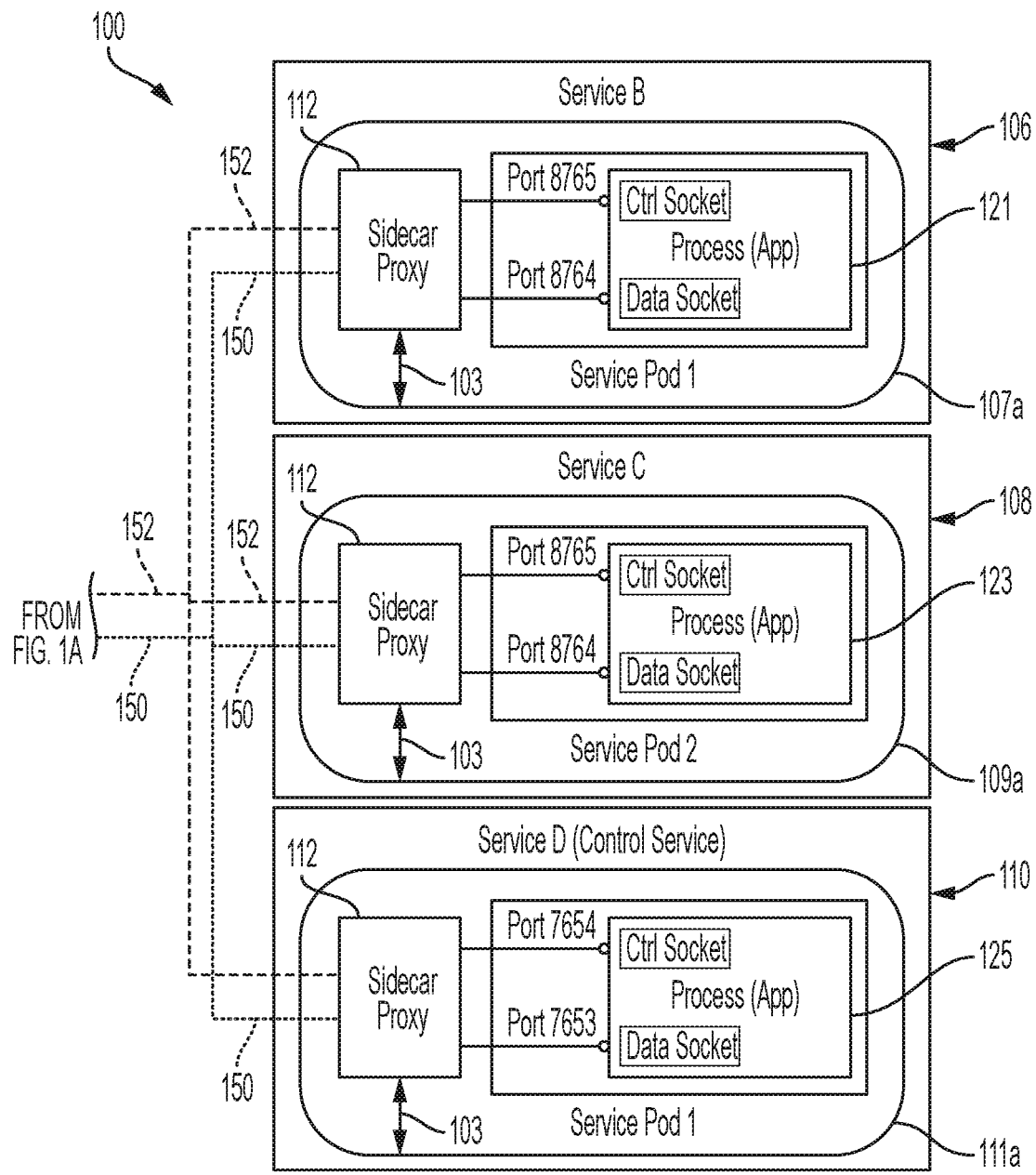

With reference now to FIGS. 1A and 1B, a scalable brokerless messaging network 100 is illustrated according to a non-limiting embodiment. The scalable brokerless messaging network 100 employs a control plane 102 and a service mesh including a plurality of service nodes 104, 106, 108, 110 (collectively referred to as 104-110). Although four service nodes 104-110 are shown, more or less service nodes can be implemented without departing from the scope of the present disclosure.

The control plane 102 is in signal communication with the sidecar proxy 112 of each of the service nodes 104-110 via a control plane service interface 103 (as indicated by signal arrow 103) included in the service mesh. The sidecar proxies are configured to secure pub/sub messaging exchanged between the service nodes 104-110 by providing security and management operations. The security and management operations include, but are not limited to, service discovery, load balancing, message routing, configuration management, authentication and authorization, and data/message encryption. In one or more non-limiting embodiments, the control plane 102 can manage the service mesh with services such as provided by "Istio", for example, to provide security concepts such as "zero trust" architecture and mutual TLS (mTLS).

The service nodes 104-110 are configured to exchange data with one another. Each service node 104-110 includes one or more instances of a service, referred to as "service pods". For example, service node 104 includes service pods 105a, 105b . . . 105n (collectively referred to as 105a-105n), service node 106 includes service pod 107a, service node 108 includes service pod 109a, and service node 110 includes service pod 111a. In one or more non-limiting embodiments, a service node included in the service mesh can serve as a control service node. For example, service node 110 can serve as a control service node 110.

The service nodes 104-110 each include a sidecar proxy 112 configured to establish an encrypted data exchange with one another. The encrypted data exchanged between services includes an encrypted control messaging connection 150 and an encrypted data connection 152. The encrypted control messaging connection 150 exchanges "critical information" such as, for example, time synchronization messages and notifications of a top-level operational change that would warrant a change in behavior. The encrypted data connection 152 (i.e., a data pub/sub channel) exchanges general publish/subscription data, i.e., published data generated by an application and received by one or more subscribers.

Each service can include a control socket ("ctrl socket") 116 and a data socket 118. The ctrl socket 116 and the data socket 118 are independent or isolated from one another. In one or more non-limiting embodiments, each sidecar proxy 112 can exchange data with the control plane 102 via the control plane service interface 103. At initialization, the services within the control plane 102 provide configuration data to each sidecar proxy 112 of the service nodes 104-110. This configuration data includes, but is not limited to, security certificates used for encrypted communication within the deployment, role-based access control (RBAC) rules, and information about other services in the deployment. The configuration data is used for both discovery and authorization such that a given application service 114-125 can register itself with respective service node 104-110 included in the service mesh. In one or more non-limiting embodiments, each service node 104-110 generates a TCP list including each TCP socket connection between each application service 114-125. Accordingly, the application services 114-125 establish a messaging middleware layer that delivers a message from a publisher service node to one or more subscriber service nodes based on the TCP connections included in the TCP list. Once this initialization process is complete, the service nodes 104-110 can securely communicate with each within the service mesh.

The sidecar proxies 112 work in concert with the control plane 102 to perform load balancing by dynamically tracking and distributing traffic within the service mesh based on a messaging policy. This dynamic routing uses of dynamic DNS resolution to deliver messages to the specified instance of a vertically scaled service as illustrated in service node 104. For example, messages published by service nodes 106-110 will be delivered according to the load balancing rules to each scaled instance of pods 105a, 105n . . . 105n within service node 104.

The service nodes 104-110 establish a messaging middleware layer that facilitates a brokerless pub/sub messaging pattern that utilizes its respective sidecar proxy 112 and service mesh to facilitate secure communication. In one or more non-limiting embodiments, the service nodes 104-110 establish a messaging middleware layer that facilitates brokerless pub/sub messaging in a cloud computing environment. It should be appreciated, however, that the middleware layer is not limited to a cloud computing environment. For example, the messaging middleware can be employed in an embedded system without departing from the scope of the present disclosure. As described herein, service node 110 can serve as a control service node 110 while the remaining service nodes 104-108 can serve as worker service nodes 104-108. The control service node 110 is responsible for providing critical information that must be received by each service node 104-110 in the mesh, including scaled instances of a single service (such as service 104). Examples of critical information include time synchronization messages and notifications of a top-level operational change that would warrant a change in behavior. When the control service node 110 is employed in the service mesh, all worker service nodes 104-108 must establish a connection via their respective ctrl socket 116 to the control service node 110 to receive the critical information described herein.

The worker service nodes 104-108 are also interconnected (e.g., in a one-to-many or many-to-many relationship) via the data socket 118 to establish a data plane. In one or more non-limiting embodiments, the data plane uses a multiple-publisher/multiple-subscriber relationship to facilitate the pub/sub messaging scheme. This is implemented using the TCP protocol such that each service node will have multiple point-to-point connections to the other services node in the network. Thus, for a deployment with "N" number of service nodes, each service node will establish N−1 TCP connections. The messaging middleware will deliver all outgoing messages on the encrypted data connection 152 to each of these connections. Filtering of message subscriptions happens on the inbound side of the middleware. If a message is received that the service is not subscribed to, it a may be dropped.

In one or more non-limiting embodiments, the control service node 110 uses a single publisher-multiple subscriber relationship for its messaging scheme. Accordingly, should high-availability be a design goal, the control service node 110 can be configured to provide redundancy through the use of a circuit-breaker routing pattern in the service mesh provided the control service is stateless or has its state externalized using a caching service.

When a message is sent from a given application process 114, 117, 119, 121, 123 and 125 (i.e., a host application process), it is sent with the destination service address and the destination port. The corresponding host sidecar proxy 112 intercepts this traffic and queries the control plane for the specific IP address information of the destination service. The control plane 102 uses its routing and load balancing rules to provide the host sidecar proxy 112 with the specific IP address of the destination sidecar proxy 112. In one or more non-limiting embodiments, the control plane 102 scales instances of a service pod to aggregate a respective service node 104-110. For example, the control plane 102 can automatically increase the number of service pods in a given service node 104-110 based on load and available resources (e.g., CPU processing, RAM usage, etc.) in the scalable brokerless messaging network 100.

The host sidecar proxy 112 encrypts outgoing data (e.g., published messages) with the public key of the destination sidecar proxy 112 and sends it out. The destination sidecar proxy 112 included in a destination service node receives incoming data (e.g., the incoming message), decrypts it with its private key, and delivers the decrypted data/message to the destination application process 114, 117, 119, 121, 123 and 125 included in the service pod.

Figure 2A:
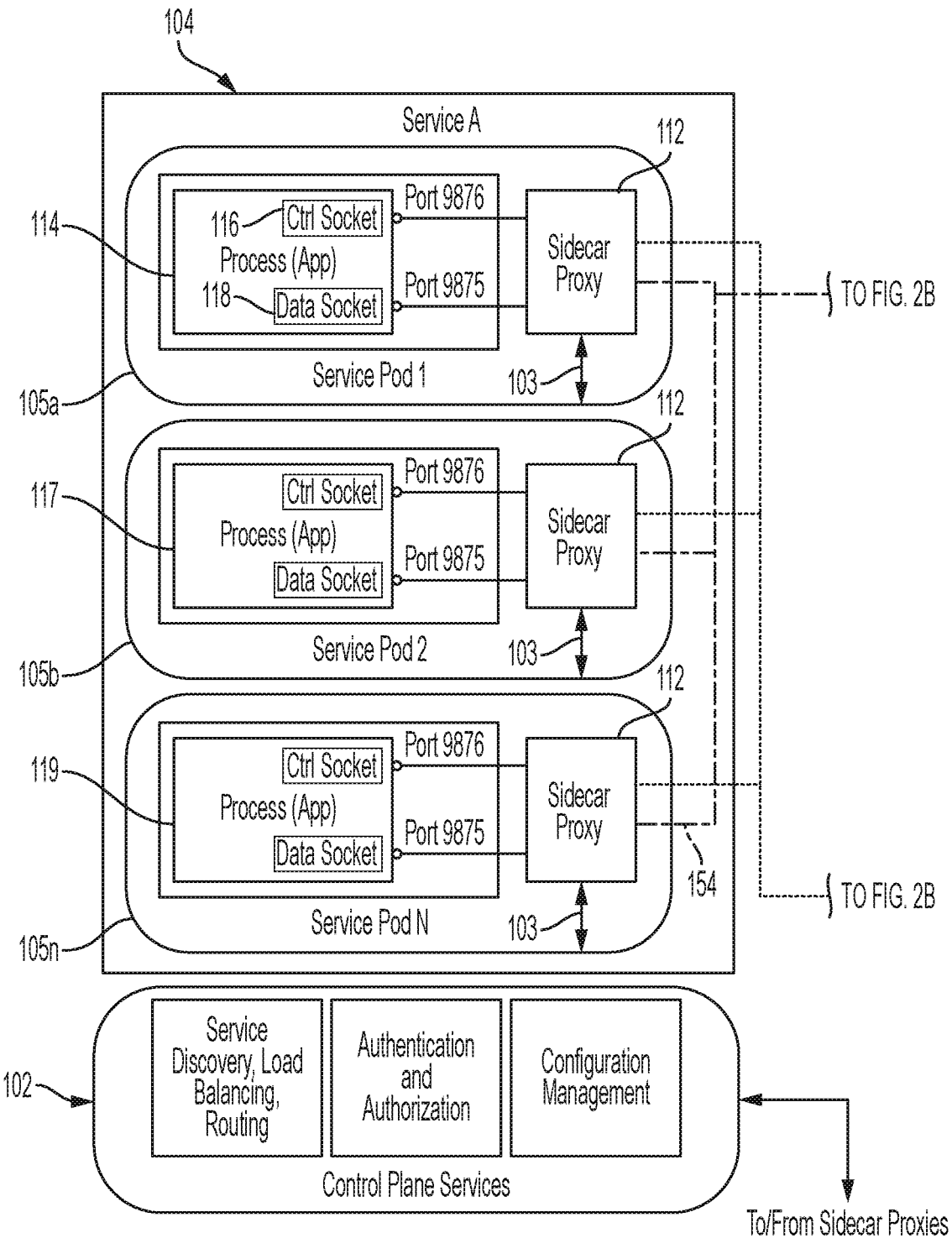
FIGS. 2A and 2B is a block diagram of a scalable brokerless messaging network according to another non-limiting embodiment.
Figure 2B:
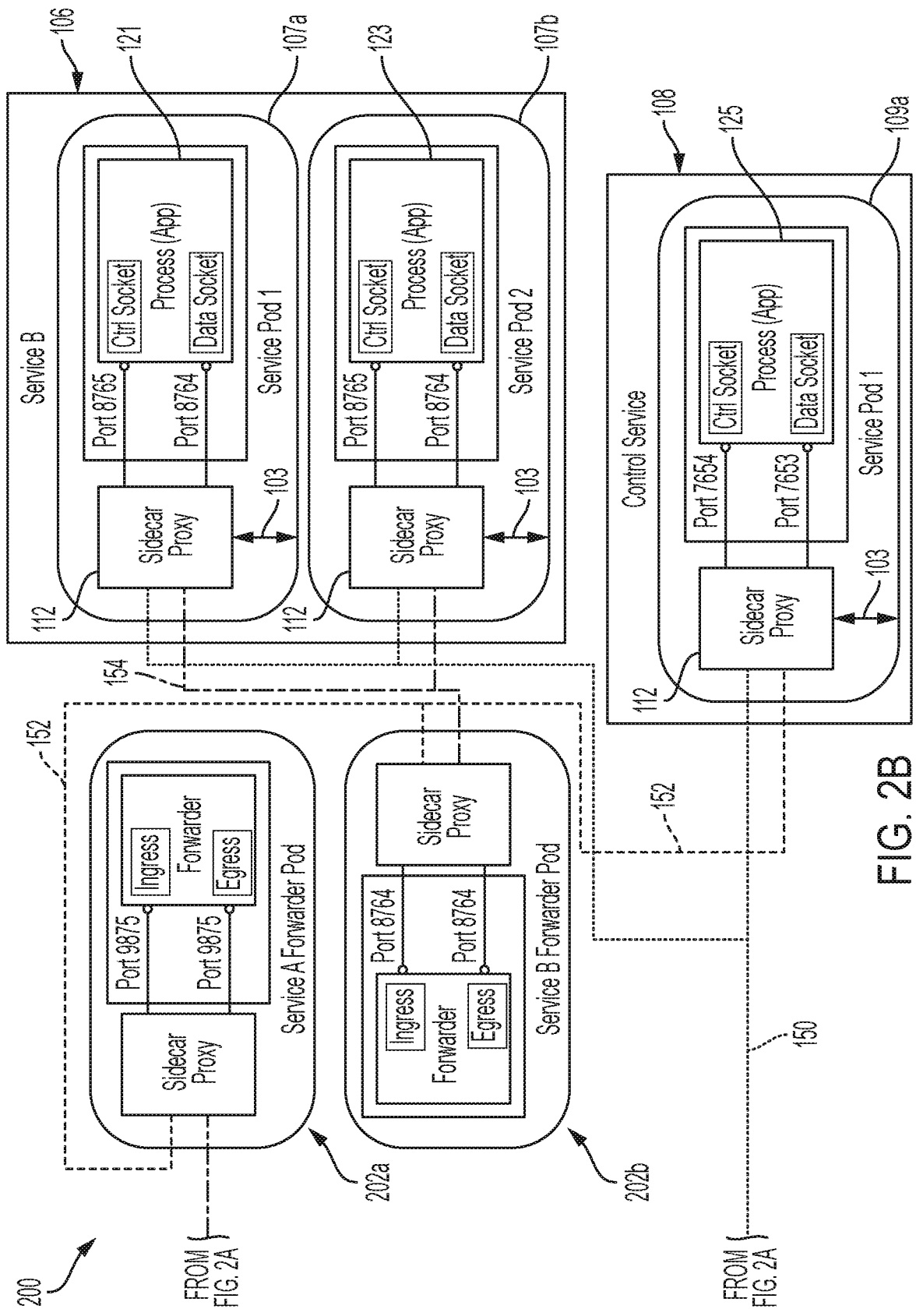

Turning now to FIGS. 2A and 2B, a scalable brokerless messaging network 200 is illustrated according to another non-limiting embodiment. The scalable brokerless messaging network 200 includes a plurality of service nodes 104, 106, 108, and one or more service forwarder pods 202a and 202b. Service node 104 includes service pods 105a-105n, service node 106 includes service pods 107a and 107b, and service node 108 includes service pod 109a.

The service forwarder pods 202a and 202b facilitate the capability of consolidating and forwarding messages 154 between multiple scaled instances of multiple service pods in a mesh network. Although two service forwarder pods 202a and 202b are shown, more or less service forwarder pods can be employed without departing from the scope of the present disclosure.

The service forwarder pods 202a and 202b are configured to aggregate messages 154 to corresponding service nodes 104 or 106 and distribute messages on egress amongst the service pods by querying the control plane for the specific IP address information of the sidecar proxy for the destination service pod. The control plane provides the IP addresses for the service pods 105a-105n or 107a-107b in accordance with the load balancing rules. The service forwarder pods 202a and 202b are capable of resolving unbalanced connections. For example, the service forwarder pods 202a and 202b can resolve an unbalanced connection that occurs when multiple vertically scaled service pods communicate within the same publish and subscribe network in an unbalanced many-to-many connection as each instance of a service pod increases. For example, an unbalanced connection can occur when one service pod in a first service node does not have a corresponding connection to a service pod in a second service node. Thus, an application service 114 from a scaled service node (e.g., service node 104) may not receive messages published by the other application services in the other service nodes 106-110. As a result, an unbalanced connection can occur when the service pods 105a-105n do not have a direct connection to a respective subscriber destination because a discrete point-to-point connection has not been established with every destination subscriber service node 107a-107b. The forwarder pods 202a and 202b can resolve the aforementioned issue and can route messages so as to maintain balance of the service mesh.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the forms disclosed. Many modifications and variations will be apparent to those of ordinary skill in the art without departing from the scope and spirit of the present disclosure. The embodiments were chosen and described in order to best explain the principles of the present disclosure and the practical application, and to enable others of ordinary skill in the art to understand the present disclosure for various embodiments with various modifications as are suited to the particular use contemplated.

While the preferred embodiments to the present disclosure have been described, it will be understood that those skilled in the art, both now and in the future, may make various improvements and enhancements which fall within the scope of the claims which follow. These claims should be construed to maintain the proper protection for the present disclosure first described.

What is claimed is:

1. A scalable brokerless messaging network comprising:
   a service mesh including a plurality of service nodes in signal communication with one another to exchange a plurality of messages; and
   a control plane in signal communication with the plurality of service nodes and configured to register an application service associated with a given service node included in the service mesh,
   wherein the plurality of service nodes define a messaging middleware layer that establishes several point-to-point connections between each service in the network via transmission control protocol (TCP) sockets, and
   wherein the messaging middleware layer dynamically manage the point-to-point connections to dynamically scale the service mesh based on a load realized by the service mesh.

2. The scalable brokerless messaging network of claim 1, wherein each of the service nodes includes a sidecar proxy, the sidecar proxy configured to encrypt an outgoing message generated by a host application process with a public key of a destination service node among the plurality of service nodes, and to decrypt an incoming message with a private key and deliver the decrypted incoming message to a destination application process.

3. The scalable brokerless messaging network of claim 2, wherein at least one of the service nodes among the plurality of service nodes operates as a control service node and the remaining service nodes included in the plurality of service nodes service as worker service nodes.

4. The scalable brokerless messaging network of claim 3, wherein each instance of the worker service nodes is scaled to established individual scaled instances of the worker services.

5. The scalable brokerless messaging network of claim 4, wherein the control service node is configured to distribute the messages to each of the individual scaled instance of the worker service nodes according to at least one routing rule defined by the service plane.

6. The scalable brokerless messaging network of claim 2, wherein the at least one routing rule provides "zero trust" architecture and mutual Transport Layer Security (mTLS) encryption between each service node among the plurality of service nodes.

7. The scalable brokerless messaging network of claim 1, further comprising at least one service forwarder pod in signal communication with the plurality of service nodes, the at least one service forwarder pod configured to aggregate the plurality of messages to a corresponding service nodes and distribute the plurality of messages in accordance with load balancing rules defined by the control plane.

8. The scalable brokerless messaging network of claim 1, wherein the messaging middleware layer is implemented in a cloud computing environment.

9. A method of exchanging data in a scalable brokerless messaging network, the method comprising:
    establishing signal communication between a service mesh including a plurality of service nodes to exchange a plurality of messages;
    establishing signal communication between a control plane and the plurality of service nodes;
    registering an application service associated with a given service node included in the service mesh and the control plane;
    defining a messaging middleware layer via the plurality of service nodes to establish a plurality of point-to-point connections between each service node in the service mesh via transmission control protocol (TCP) sockets; and
    monitoring a load of the scalable brokerless messaging network; and
    dynamically managing the point-to-point connections to dynamically scale the service mesh based on the load realized by the service mesh.

10. The method of claim 9, further comprising:
    encrypting, via a sidecar proxy included in at least one of the service nodes, outgoing messages generated by a host application process with a public key of a destination service node among the plurality of service nodes; and
    decrypting, via the sidecar included in at least one of the service nodes, an incoming message with a private key and deliver the decrypted incoming message to a destination application process.

11. The method of claim 10, further comprising establishing a first data connection, via the TCP sockets included in each of the service nodes, a first data connection between the application process and the sidecar proxy; and
    establishing a second data connection, via a data socket, between the application process and the sidecar proxy that is independent from the first data connection.

12. The method of claim 11, further comprising operating at least one of the service nodes among the plurality of service nodes as a control service node; and
    operating the remaining service nodes included in the plurality of service nodes service as worker service nodes.

13. The method of claim 12, wherein each instance of the worker service nodes is scaled to established individual scaled instances of the worker services.

14. The method of claim 13, further comprising distributing, via the control service node, the messages to each of the individual scaled instance of the worker service nodes according to at least one routing rule defined by the service plane.

15. The method of claim 10, wherein the at least one routing rule provides "zero trust" architecture and mutual Transport Layer Security (mTLS) encryption between each service node among the plurality of service nodes.

16. The method of claim 9, further comprising:
    establishing signal communication between at least one service forwarder pod in and the plurality of service nodes;
    aggregating, via the at least one service forwarder pod, the plurality of messages to a corresponding service node; and
    distributing the plurality of messages in accordance with load balancing rules defined by the control plane.

17. The method of claim 9, wherein the messaging middleware layer is implemented in a cloud computing environment.

18. A messaging middleware layer included in a scalable brokerless messaging network, the messaging middleware layer comprising:
    a first application process included in a first service node and configured to operate according to the messaging middleware layer, the first application process configured to exchange data with at least one second application process included in a at least one second service node,
    wherein the messaging middleware layer dynamically manages a transmission control protocol (TCP) socket connection established between the first service node and the second service node based on a load realized by the scalable brokerless messaging network.

19. The messaging middleware layer of claim 18, wherein the first application process detects a message to be published and delivers the message to the at least one second service node based on the TCP socket connection.

20. The messaging middleware layer of claim 19, wherein the at least one second application process includes a plurality of second application processes, each second application process having a TCP socket connection with the first application process,
    wherein the first service node generates a TCP list including each TCP socket connection corresponding to the plurality of second application processes and delivers the message based on the TCP list.

* * * * *